(12) United States Patent
Yashiro

(10) Patent No.: US 8,942,511 B2
(45) Date of Patent: Jan. 27, 2015

(54) APPARATUS AND METHOD FOR DETECTING OBJECT FROM IMAGE, AND PROGRAM

(75) Inventor: Satoshi Yashiro, Yokohama (JP)

(73) Assignee: Canon Kabushiki Kaisha, Tokyo (JP)

(*) Notice: Subject to any disclaimer, the term of this patent is extended or adjusted under 35 U.S.C. 154(b) by 108 days.

(21) Appl. No.: 13/212,546

(22) Filed: Aug. 18, 2011

(65) Prior Publication Data

US 2012/0051592 A1  Mar. 1, 2012

(30) Foreign Application Priority Data

Aug. 26, 2010  (JP) ................. 2010-189857

(51) Int. Cl.
 *G06K 9/36* (2006.01)
 *G06K 9/44* (2006.01)
 *G06K 9/32* (2006.01)
 *G06K 9/48* (2006.01)

(52) U.S. Cl.
 CPC ............ *G06K 9/44* (2013.01); *G06K 2009/485* (2013.01); *G06K 9/3241* (2013.01)
 USPC ........................................................ 382/286

(58) Field of Classification Search
 None
 See application file for complete search history.

(56) References Cited

U.S. PATENT DOCUMENTS

| | | | | |
|---|---|---|---|---|
| 2003/0012277 A1* | 1/2003 | Azuma et al. | ............ | 375/240.08 |
| 2007/0237387 A1 | 10/2007 | Avidan | | |
| 2008/0181507 A1* | 7/2008 | Gope et al. | ..................... | 382/190 |
| 2008/0260213 A1* | 10/2008 | Hatano et al. | ................. | 382/118 |
| 2009/0010546 A1 | 1/2009 | Rossato | | |
| 2009/0153730 A1* | 6/2009 | Knee et al. | ..................... | 348/445 |

FOREIGN PATENT DOCUMENTS

| | | |
|---|---|---|
| JP | H02-217973 A | 8/1990 |
| JP | H07-168932 A | 7/1995 |
| JP | H07-262371 A | 10/1995 |
| JP | H07-333173 A | 12/1995 |
| JP | 2001-014474 A | 1/2001 |
| JP | 2002-259983 A | 9/2002 |
| JP | 2003-006619 A | 1/2003 |
| JP | 3729562 B2 | 12/2005 |
| JP | 2006-18658 A | 1/2006 |

OTHER PUBLICATIONS

Motomasa Tomida et al.; "Hand and Posture With Forearm Moving Estimation System;" University of Tsukuba, Graduate School of Systems, and Information Engineering; ITE Technical Report; vol. 33; No. 40; Oct. 8, 2009, pp. 1-7.

* cited by examiner

Primary Examiner — Nirav G Patel
Assistant Examiner — Amandeep Saini
(74) Attorney, Agent, or Firm — Canon USA, Inc. IP Division

(57) ABSTRACT

An image processing apparatus includes an input unit configured to input an image, a determining unit configured to determine a foreground area and a background area in the image input by the input unit, an expansion unit configured to expand the foreground area determined by the determining unit, a calculating unit configured to calculate a feature amount of the foreground area expanded by the expansion unit, and a detecting unit configured to detect an object from the image using the feature amount.

7 Claims, 8 Drawing Sheets

501 FOREGROUND/BACKGROUND BOUNDARY

FIG. 5C

| | BACKGROUND IMAGE BEFORE EXPANSION | | | |
|---|---|---|---|---|
| 0 | 0 | 0 | 1 | 1 |
| 0 | 0 | 0 | 1 | 1 |
| 0 | 0 | 0 | 1 | 1 |
| 0 | 0 | 0 | 1 | 1 |
| 0 | 0 | 0 | 1 | 1 |

FIG. 5D

| | REDUCED IMAGE LUMINANCE VALUE | | | |
|---|---|---|---|---|
| 100 | 95 | 50 | 0 | 0 |
| 100 | 95 | 50 | 0 | 0 |
| 100 | 95 | 50 | 0 | 0 |
| 100 | 95 | 50 | 0 | 0 |
| 100 | 95 | 50 | 0 | 0 |

FIG. 5E

| | GRADIENT MAGNITUDE (M) | | | |
|---|---|---|---|---|
| 5 | 50 | 95 | 50 | 0 |
| 5 | 50 | 95 | 50 | 0 |
| 5 | 50 | 95 | 50 | 0 |
| 5 | 50 | 95 | 50 | 0 |
| 5 | 50 | 95 | 50 | 0 |

FIG. 5F

|   | BACKGROUND IMAGE AFTER EXPANSION | | | |
|---|---|---|---|---|
| 0 | 1 | 1 | 1 | 1 |
| 0 | 1 | 1 | 1 | 1 |
| 0 | 1 | 1 | 1 | 1 |
| 0 | 1 | 1 | 1 | 1 |
| 0 | 1 | 1 | 1 | 1 |

FIG. 5G

|   | AFTER SETTING FEATURE | | | |
|---|---|---|---|---|
| 0 | 50 | 95 | 50 | 0 |
| 0 | 50 | 95 | 50 | 0 |
| 0 | 50 | 95 | 50 | 0 |
| 0 | 50 | 95 | 50 | 0 |
| 0 | 50 | 95 | 50 | 0 |

APPARATUS AND METHOD FOR DETECTING OBJECT FROM IMAGE, AND PROGRAM

BACKGROUND OF THE INVENTION

1. Field of the Invention

The present invention relates to an apparatus and a method for detecting an object from an image, and a program.

2. Description of the Related Art

As a technique for detecting an object from an image captured by a camera, some techniques have been discussed as follows. One is a method for detecting a moving object using a background difference method. In the background difference method, an image without an object is captured by a camera fixed in an immovable position and registered as a background image in advance. When an object is detected, a difference between the image captured by the camera and the background image, and difference area is obtained as a moving object. Recently, an improved technique of the background difference method has been discussed.

For example, in a technique discussed in Japanese Patent No. 3729562, a differential image of a background model is generated using different resolutions or different spatial frequency bands, and according to a difference image between the differential image of the background model and a differential image of an input image, it is determined whether the object is an object of interest. Thus, the differential images are utilized for robust determination with respect to variation in brightness due to a change in illumination.

In a technique discussed in Japanese Patent Application Laid-Open No. 2001-014474, after the background difference is calculated, whether a pixel belongs to the foreground or the background is determined by using a majority filter at the boundary between the foreground and the background. The majority filter is designed to determine a state of a target pixel according to the majority of states of neighboring pixels of the target pixel. Accordingly, an image including only a moving object is generated which is free of background noise or "moth-eaten" regions. In a technique discussed in Japanese Patent Application Laid-Open No. 2006-18658, in moving object detection, an unnecessary moving object is removed by calculating a logical product of a plurality of binary background difference images or expanding the binary background difference images.

An example of a technique for detecting an object, such as a face or a person, from an image is discussed in United States Patent Publication Application No. 2007/0237387, for example. The technique is directed to determining whether an input pattern is a human body or not by evaluating the features of Histograms of Oriented Gradients (HOG). The features of Histograms of Oriented Gradients are that a gradient magnitude and a gradient direction are obtained for each pixel and sums of the gradient magnitude of each pixel in rectangular areas referred to as cells are calculated for different gradient directions. Since the gradient magnitude depends on the contrast in the image or the like, the gradient magnitude is normalized by averaging a total sum of the gradient magnitudes in a rectangular area referred to as a block.

For the cell and the block, an area effective for determination is selected based on AdaBoost learning from among various positions and sizes on patterns. A discriminator is used for determining whether an object is a human body or not based on the features of Histograms of Oriented Gradients. A plurality of the discriminators is connected in series. Only when the object is determined as a human body, a subsequent-stage discriminator performs determination, and thus the high speed processing can be realized.

However, the technique discussed in the Japanese Patent No. 3729562 is not robust to a movement of the background. For instance, if the background partially shakes by wind, it is impossible to obtain good gradient difference images. In addition, since the background model and an input image have the same gradients in the background areas, the gradients cancel each other by calculating a difference between the background areas. However, in the foreground area, the gradients do not cancel each other, so that the gradient component of the background area remains in the foreground area of a difference image.

In the technique discussed in Japanese Patent Application Laid-Open No. 2001-014474, if an image of a right moving object is obtained, it is easy to determine what the moving object is from a contour of the moving object. However, when the resolution used to determine the background is decreased, this technique cannot robustly maintain determination performance. For example, if it is arranged to determine the background in blocks of 8*8 pixels, determination accuracy can be improved and a processing cost can be decreased. However, if the technique in Japanese Patent Application Laid-Open No. 2001-014474 is used to detect a human figure with a height corresponding to about 100 pixels, because the human figure will appear in a size about four blocks wide and 12 blocks high, the contour of the human figure becomes inconspicuous.

According to the technique in Japanese Patent Application Laid-Open No. 2006-18658, in order to determine whether a moving object is an unnecessary one or not in a method for detecting a moving object, small moving objects are deleted by an expansion and reduction processing, or areas which contact with each other by expanding are combined as a single moving object. However, this technique is unable to discriminate a person from other moving objects with high accuracy. The technique discussed in United States Patent Publication Application No. 2007/0237387 is directed to detecting an object, such as a human figure, in an image. However, when this technique is applied to a moving image, an issue may arise that an area, which looks like a detection target in the background, is detected mistakenly as a moving object.

SUMMARY OF THE INVENTION

The present invention is directed to a technique capable of detecting an object in an image with high accuracy.

According to an aspect of the present invention, an image processing apparatus includes an input unit configured to input an image, a determining unit configured to determine a foreground area and a background area in the image input by the input unit, an expansion unit configured to expand the foreground area determined by the determining unit, a calculating unit configured to calculate a feature amount of the foreground area expanded by the expansion unit, and a detecting unit configured to detect an object from the image using the feature amount.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

FIGS. 5A to 5G illustrate examples of reduced images and pixel values.

DESCRIPTION OF THE EMBODIMENTS

Various exemplary embodiments, features, and aspects of the invention will be described in detail below with reference to the drawings.

Figure 2:
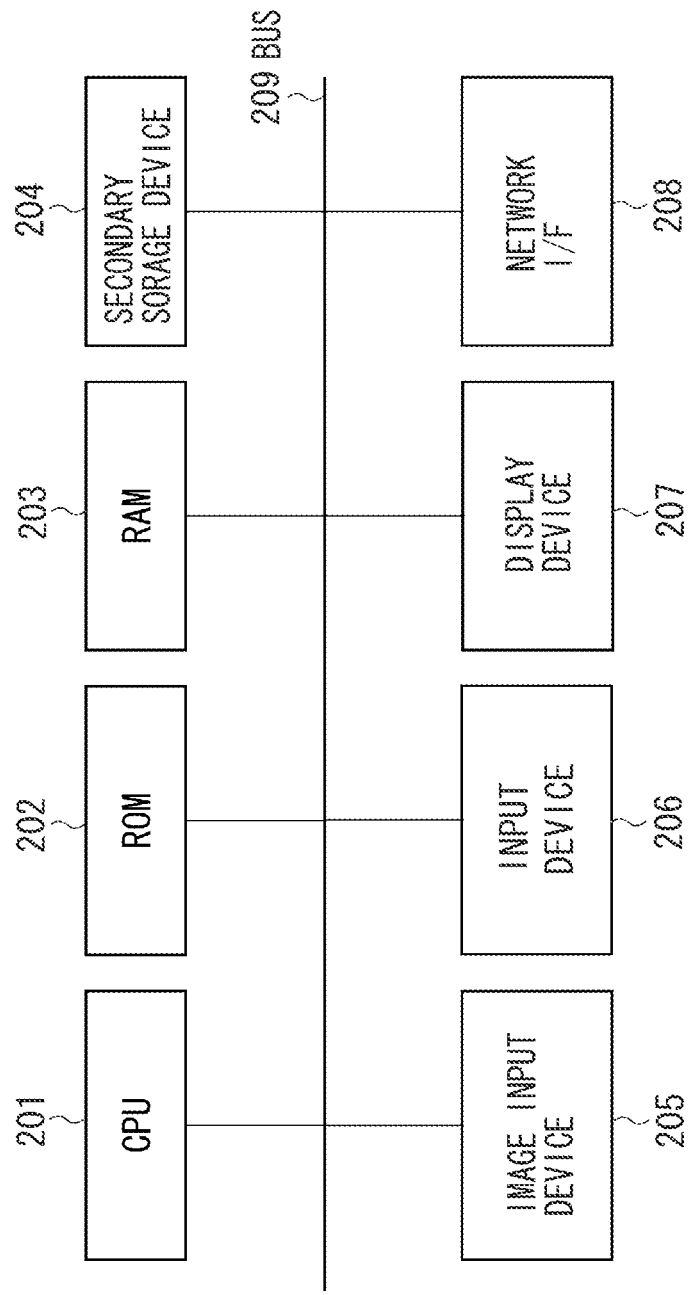
FIG. 2 is a block diagram illustrating an example of a hardware configuration of the image processing apparatus.

A first exemplary embodiment of the present invention will be described with reference to drawings. FIG. 2 is a block diagram of an example of a hardware configuration of the image processing apparatus according to the first exemplary embodiment. In FIG. 2, a central processing unit (CPU) 201 executes a command according to a program stored in a read-only memory (ROM) 202 and a random access memory (RAM) 203. The ROM 202, which is a non-volatile memory, stores a program used to perform processing according to the present exemplary embodiment and programs and data pieces necessary for control. The RAM 203 is a volatile memory and stores temporary data, such as frame image data and pattern determination results.

A secondary storage device 204 is a rewritable secondary storage device, such as a hard disk drive and a flash memory, and stores image information, an image processing program, and various setting contents. These pieces of information, data, and programs and are transferred to the RAM 203 and used and executed by the CPU 201. An image input device 205 may include a digital video camera, a network camera, and an infrared camera. The image input device 205 is used to input image data.

An input device 206 may include a keyboard and a mouse, which is operated by an operator to input a command and information. A display device 207 may include a cathode-ray tube (CRT) display and a liquid crystal display. A network interface (I/F) 208 may include a modem and a local area network (LAN) to connect to a network, such as the Internet or an intranet. The network I/F 208 may be connected to an image input device, such as a network camera, and used to input image data via the network. A bus 209 connects these devices to enable them to mutually exchange data with each other. The image processing apparatus according to the present exemplary embodiment is implemented as application that runs on the operating system.

Figure 1:
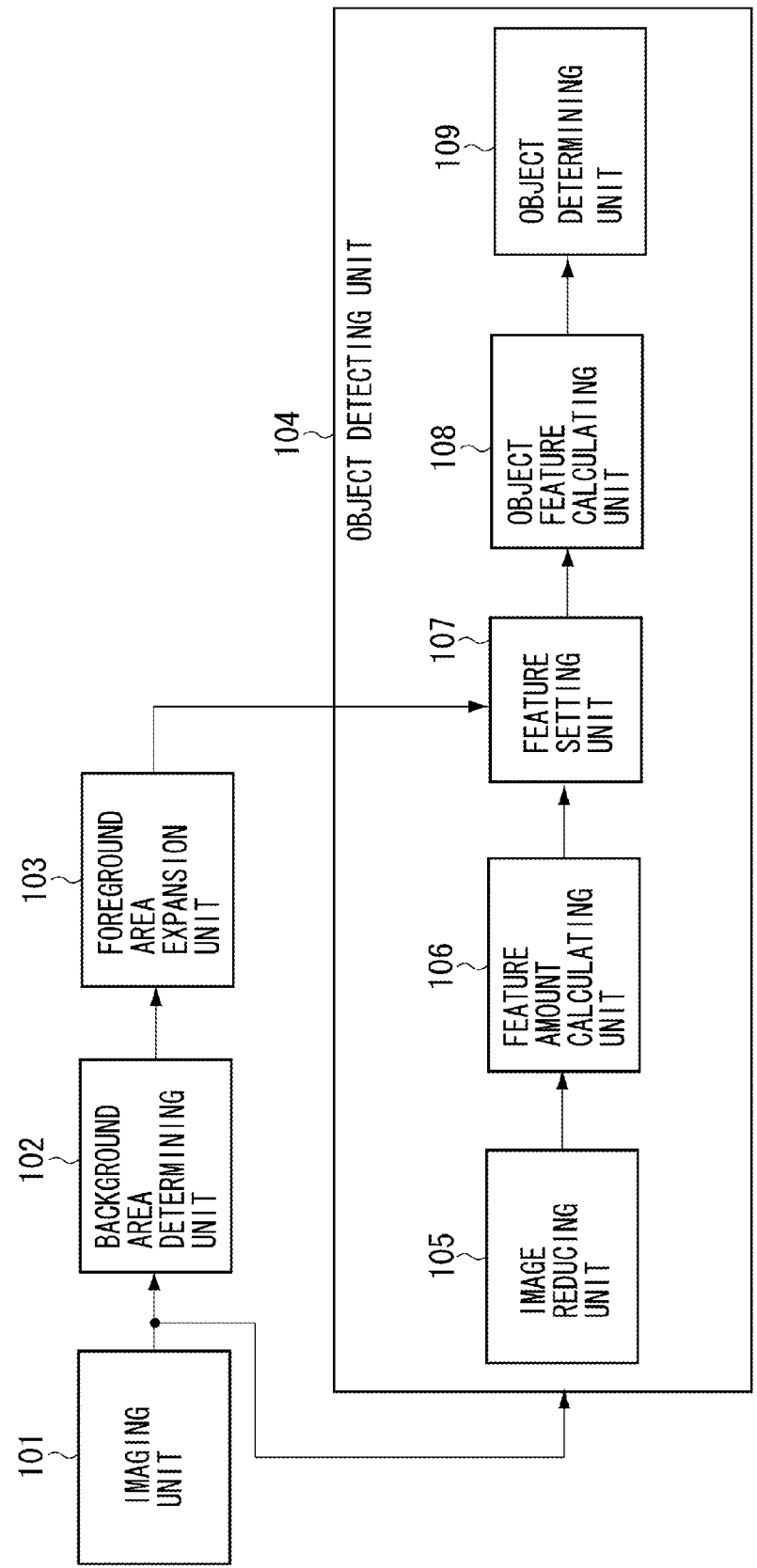
FIG. 1 is a block diagram illustrating an example of a functional configuration of an image processing apparatus.

FIG. 1 is a block diagram illustrating an example of a functional configuration of the image processing apparatus according to the present exemplary embodiment. In FIG. 1, an imaging unit 101 inputs an image via the image input device 205. A background area determining unit 102 detects a foreground area or a background area in an image captured by the imaging unit 101. A foreground area expansion unit 103 expands a boundary of the foreground area in a nominal direction based on a determination result of the background area determining unit 102. An object detecting unit 104 detects the object in the image captured by the imaging unit 101. The object detecting unit 104 includes an image reducing unit 105, a feature amount calculating unit 106, a feature setting unit 107, an object feature calculating unit 108, and an object determining unit 109.

In the present exemplary embodiment, an image processing apparatus will be described which detects a human body, such as a pedestrian, as an example of the object from an image input by the image input device 205 set in an immovable position. The present exemplary embodiment can be applied to detection of, in addition to pedestrians, other objects, such as persons on a wheel chair, a baby carriage, and a bicycle, and people pushing shopping carts, animals, and vehicles.

Figure 3:
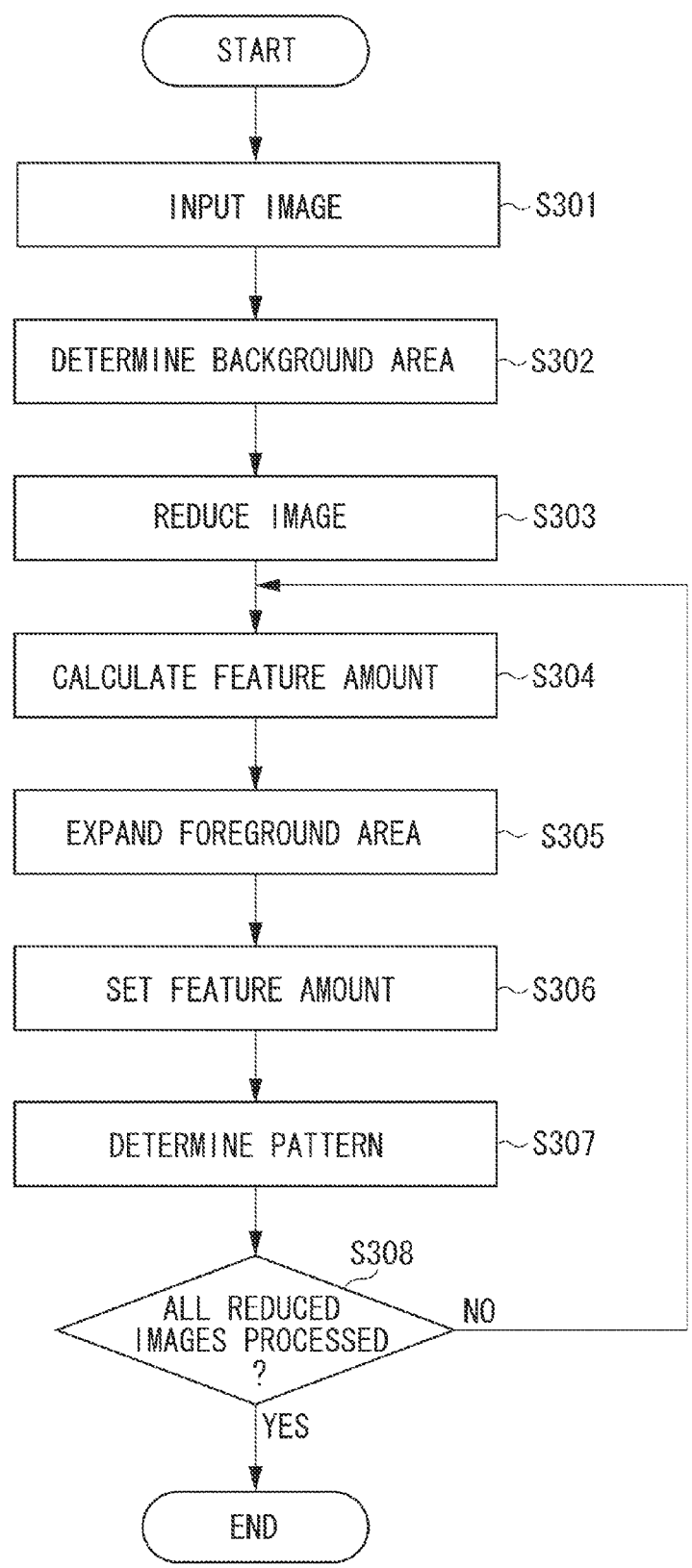
FIG. 3 is a flowchart illustrating an example of a processing procedure of detecting an object.

FIG. 3 is a flowchart illustrating an example of a processing procedure of detecting an object in the present exemplary embodiment. In step S301, the imaging unit 101 inputs moving image data as a video. In the present exemplary embodiment, the resolution of moving images is based on the video graphics array (VGA), and 30 luminance images are input per second. The present exemplary embodiment does not have any limitation to resolution and frame rates, and can be applied to color images.

In step S302, the background area determining unit 102 determines a background area in the input image. More specifically, a background image without an object is generated in advance. Then a luminance difference between the input image and the background image is obtained by the pixel, and a pixel with a luminance value lower than a predetermined threshold value is determined as a background pixel. A determination result is expressed as a binary background image in which zero (0) is assigned to the background area and one (1) is assigned to the foreground area.

Instead of the above-described background image, a video of the background is captured in a certain length of time, and an average value of the luminance for the period may be used to determination. A threshold value for determination may be set for each pixel based on variance of luminance changes. An input image may be divided into a plurality of areas, such as lattice-shaped blocks, and it may be determined whether each of the divided areas is the background by using a feature amount reflecting information about color and texture in addition to the luminance value. By the above determination in area units, determination accuracy can be improved and a processing cost can be reduced. Determination results may be expressed not in binary values but in multiple values which represent probability of the background or the foreground.

Figure 4:
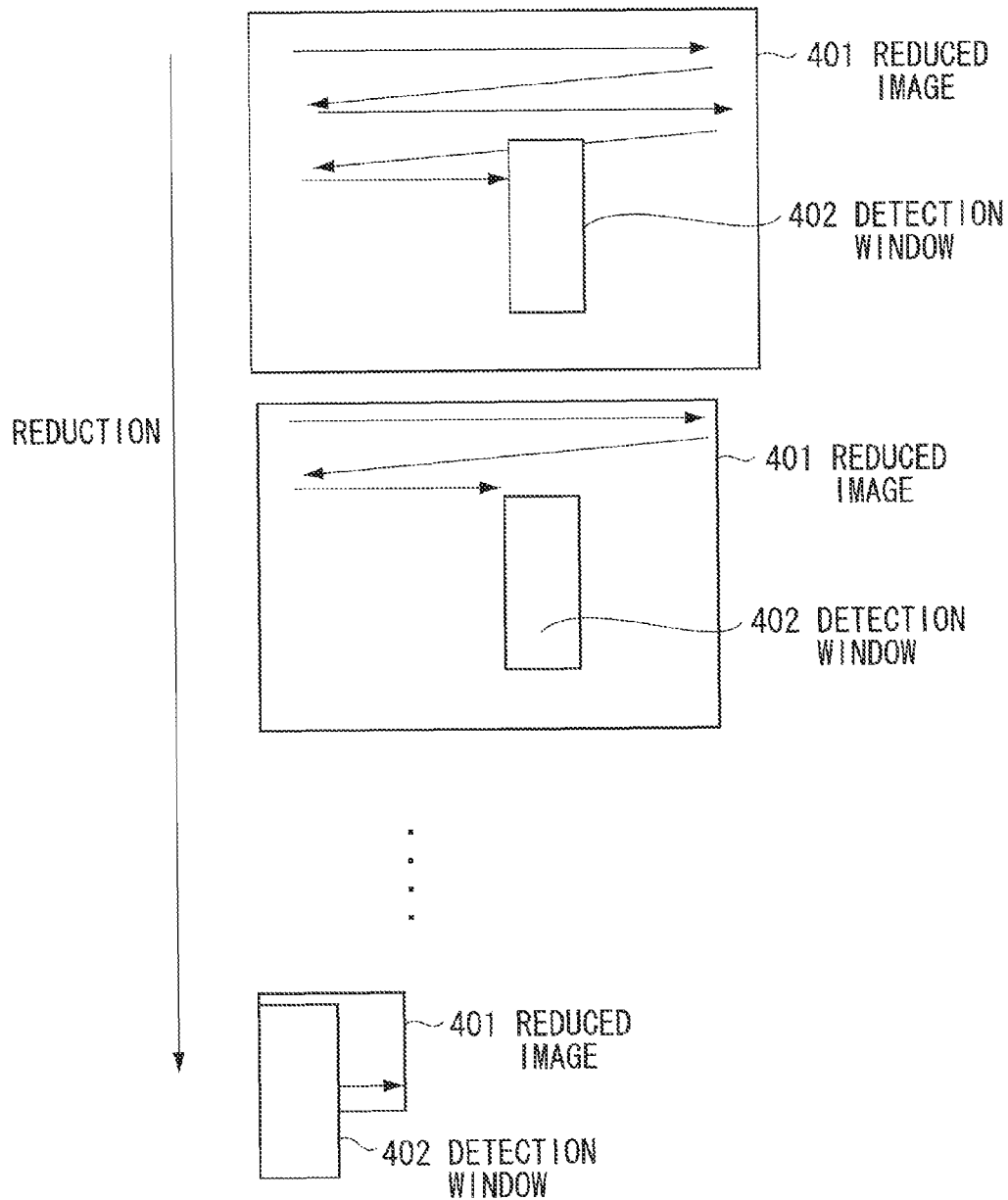
FIG. 4 illustrates an outline of detection processing of an object.

In steps S303 to S308, the object detecting unit 104 performs a series of detection processing of the object in the image. The detection processing is performed in the procedure similar to the description in United States Patent Publication Application No. 2007/0237387. In other words, as illustrated in FIG. 4, reduced images 401, which are obtained by gradually reducing an input image, are scanned by a detection window 402, and it is determined whether a pattern image within the detection window 402 is the object or not. In the present exemplary embodiment, the detection window 402 has a width of 64 pixels and a height of 128 pixels, and it is determined whether there is a person with a height of 96 pixels in standing position in the center of the detection window. Scanning by the detection window 402 is moved at intervals of 8 pixels in the horizontal and vertical directions.

In step S303, the image reducing unit 105 gradually reduces the input image and generates reduced images in an order like a pyramid by to detect various objects using object templates of predetermined sizes. In step S304, the feature amount calculating unit 106 calculates feature amounts. A differential operation is executed on the reduced image 401 of the input image in the vertical and horizontal directions using a 1*3 pixel Prewitt filter, and a gradient image is output.

If the input image at coordinates (x, y) has a luminance value I(x, y), a differential image Dx(x, y) in the horizontal direction, a differential image Dx(x, y) in the vertical direction, a gradient magnitude M(x, y), and a gradient direction θ(x, y) are expressed by an equation (1).

$$Dx(x,y)=I(x+1,y)-I(x-1,y)$$

$$Dy(x,y)=I(x,y+1)-I(x,y-1)$$

$$M(x,y)=(Dx(x,y)^2+Dy(x,y)^2)^{1/2}$$

$$\theta(x,y)=\tan^{-1}(Dy(x,y)/Dx(X,y)) \quad (1)$$

Which is more luminous, the object or the background, is irrelevant to the detection in the gradient direction, thus the detection is switched back at 180 degrees. The quantization is performed into nine directions at every 20 degrees. To obtain the gradient image, a convolution operation may be performed using, in addition to the Prewitt filter, a Laplacian filter, a Roberts filter, a Sobel filter, and the like.

In step S305, the foreground area expansion unit 103 expands the foreground area in the background image obtained in step S302. This processing clarifies the contour of the object even when the boundary between the background and the foreground overlaps with the boundary of the object. In other words, the gradient feature amount which is obtained in step S304 is dispersed into the surrounding pixels in a range corresponding to the size of the filter, and the image is thus blurred. Therefore, the gradient feature amount is expanded to a width corresponding to the filter used in step S304, and thus the gradient information on the contour of the object can be stored.

The expansion processing of the foreground area is similar to the processing described in Japanese Patent Application Laid-Open No. 2006-18658, but its aim is not the same. In the example described in Japanese Patent Application Laid-Open No. 2006-18658, the expansion processing is performed to determine whether an object is an unnecessary moving object in the moving object detecting method. On the other hand, the expansion processing executed in the present exemplary embodiment aims to make clear a feature amount of the object to improve the accuracy in determination of the object.

In the present exemplary embodiment, the expansion processing is implemented by executing a convolution operation of the input image using an averaging filter with 5*5 pixels, and by binarizing the operation result. Another method may be used is as follows. A reduction processing in step S303 is performed also on the background image at the same reduction rate as in the processing of the input image. In this processing, the binary background image is treated as a multi-valued image, and the reduction processing is performed using pixel interpolation, such as bicubic interpolation or bilinear interpolation. If binarization is performed by setting an adequate threshold for each reduced-size image, the same effects can be obtained as in the case of expanding the image according to the reduction rate. Similar effects can be obtained in degeneration of the background area.

In step S306, the feature setting unit 107 sets the feature amounts. A logical product is calculated at each pixel between the gradient magnitude calculated in step S304 and the background image with the foreground area expanded in step S305, and the gradient magnitude corresponding to the background area is cleared to zero.

In step S307, the object determining unit 109 determines a pattern in the image. Here, while performing raster scan with the detection window on the reduced image, the object determining unit repeatedly determines whether the pattern in the detection window is the object. Determination of whether the object or not is repeatedly performed at the position of each detection window with filters which are connected in series and subjected to machine learning by AdaBoost.

At each filter, the object feature calculating unit 108 calculates the feature amount of the object in a predetermined local region in the pattern. More specifically, the object feature calculating unit 108 calculates the features of histograms of oriented gradients with using the gradient magnitude and the gradient direction output in step S306. The position and size of the local regions vary with different filters, and the local regions effective in determination is obtained using the machine learning by AdaBoost.

An example of a calculating method of the feature of histograms of oriented gradients in a certain local region will be described. First, a local region is divided into 2*2 cells. Then, a sum of the gradient magnitudes is calculated for each gradient direction with respect to the pixels in each cell, and vectors in nine dimensions per cell are obtained. These vectors are normalized by being divided by a sum of the gradient magnitudes of the pixels in the local region. Thus, feature vectors in 36 dimensions of four cells are output.

Each filter linear projects the feature vector output from the object feature calculating unit 108 to a discrimination space using a projection coefficient obtained by a linear Support Vector Machine (SVM), and obtains a scalar value. The object feature calculating unit 108 converts the scalar value into a point representing probability of the object by a one-dimensional lookup table (LUT).

The object determining unit 109 adds up points of the respective filters connected in series. Only when the points of the filter are larger than threshold value, the object determining unit 109 advances the processing to the next filter. If the points are less the threshold value, the object determining unit 109 determines that the object is not included and moves the detection window to the next position. If the point becomes larger than the threshold value at the last filter, it is determined that the object exists at the position of the detection window. For the detection method of the object, some other method, which includes a convolution operation in a part of its processing, may be used.

In step S308, the object detection unit 104 determines whether detection has been completed on all reduced images. As a result of determination, if there is a reduced image to be processed next, the processing returns to step S304, and search processing for the object is performed on the next reduce image. On the other hand, if all reduced images have been processed, the processing is finished.

FIGS. 5A to 5G illustrate examples of pixel values at various stages.

Figure 5A:
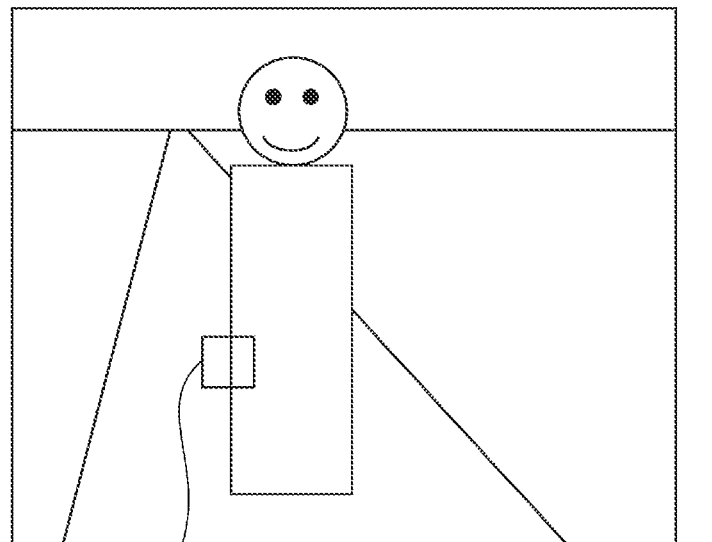
Figure 5B:
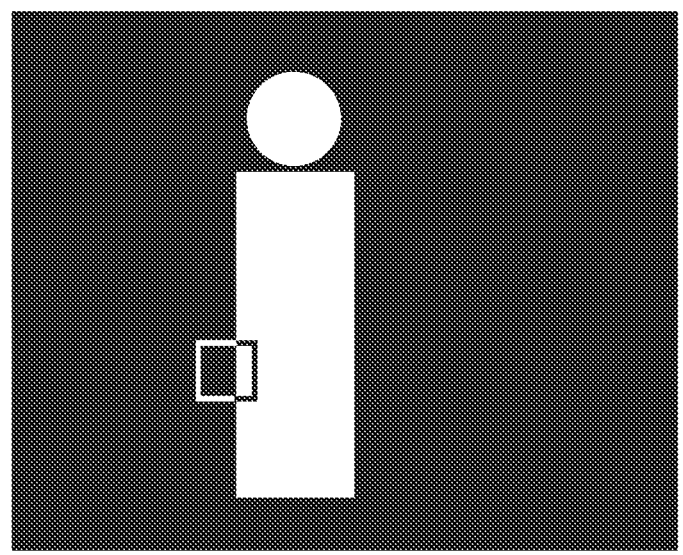

FIG. 5A illustrates an example of a reduced image produced by the image reducing unit 105 reducing the input image, and shows a human figure on the road in the center of the image. FIG. 5B illustrates a background image, and the background area is indicated in black and the foreground area is indicated in white, which correspond to the pixel positions of the reduced image. In FIG. 5A, a foreground/background boundary 501 indicates an area of 5*5 pixels including the boundary of the background around the human figure. FIGS. 5C to 5G show output results of respective processing units in the area.

FIG. 5C indicates pixel values of the foreground/background boundary 501 in the background image in FIG. 5B. The area with the pixel values of zero (0) indicates the background, and the area of pixel values of one (1) indicates the foreground. FIG. 5D indicates luminance values of the pixels in the foreground/background boundary 501 of the reduced image in FIG. 5A. FIG. 5E indicates the gradient magnitudes M calculated from the luminance values using the equation (1).

FIG. 5F indicates the pixel values after the foreground has been expanded by two pixels by the foreground area expansion unit 103. FIG. 5G illustrates the gradient magnitudes M in which the feature are set by the feature setting unit 107 based on results of the foreground area expansion unit 103. By setting the features not by using the image with pixel values in FIG. 5C but by using the image after the foreground has been expanded as illustrated in FIG. 5F, the much of the gradient magnitudes can be maintained in the area of the foreground/background boundary. By setting the gradient magnitudes of the background area at zero, the contour of the human figure can be shown relatively clearly.

According to the present exemplary embodiment, the contour formed by the boundary between the object and the background can be indicated clearly, and the accuracy in determination of the object can be improved. The present exemplary embodiment can be applied to crime prevention by a monitoring camera and to staff arrangement and a marketing system by measuring a flow of people.

Figure 6:
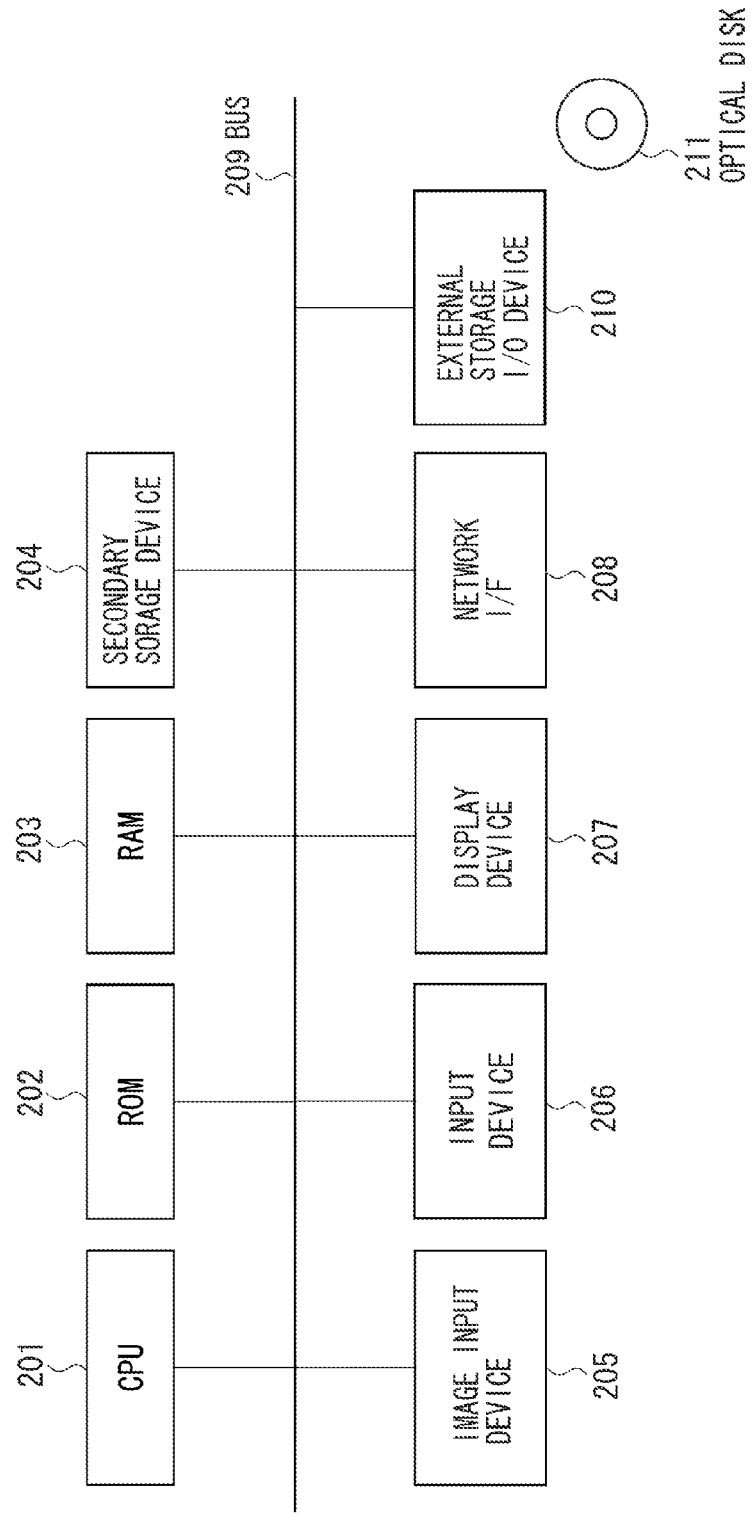
FIG. 6 is a block diagram illustrating another example of a hardware configuration of an image processing apparatus.

FIG. 6 is a block diagram illustrating a hardware configuration of an image processing apparatus according to a second exemplary embodiment of the present invention. The units which are similar to those in the first exemplary embodiment are denoted by the same reference numerals as in FIG. 2.

A difference in the composition of blocks from the first exemplary embodiment is that an optical disk 211, such as a digital versatile disk (DVD) or a compact disk (CD) in which a program is recorded, and an external storage input/output (I/O) device are added. When the optical disk 211 storing programs is inserted into the external storage I/O device 210, the CPU 201 reads the programs from the optical disk 211 and develops them to the RAM 203. Accordingly, the processing similar to that in the first exemplary embodiment can be realized.

In FIG. 1, the devices are interconnected to each other via the bus 209, but some devices can be connected via the network I/F 208. Also, a part of or all of the programs may be provided in the image input device 205.

The image input device 205 may be mounted on a camera platform to control a camera orientation, such as panning and tilting. In this case, by preparing a background model corresponding to the camera orientation, or by constructing a background model, which is converted to a scale corresponding to zoom magnification, by defining a coordinate system which has coordinate axes representing the horizontal and vertical angles of the camera, for example, the present invention can be applied even though the camera orientation is varied.

The present invention can also be realized by executing the following processing. More specifically, software (a program) for realizing the functions of the above exemplary embodiments is supplied to a system or an apparatus via a network or various storage media and a computer (or CPU or micro processing unit (MPU)) of the system or the apparatus reads and executes the program.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2010-189857 filed Aug. 26, 2010, which is hereby incorporated by reference herein in its entirety.

What is claimed is:

1. An image processing apparatus, comprising:
a processor; and
a memory storing instructions that, when executed by the processor, cause the processor to perform operations comprising:
inputting an image;
determining a foreground area and a background area in the input image;
reducing the input image at a plurality of reduction rates;
expanding the foreground area with respect to each of a plurality of reduced images obtained by reducing the input image at the plurality of reduction rates, by adding, to the foreground area, a surrounding area which is required for obtaining a feature amount of a boundary between the background area and the foreground area;
calculating a feature amount of the expanded foreground area; and
detecting an object from the foreground area using the feature amount of the expanded foreground area.

2. The image processing apparatus according to claim 1, wherein calculating comprises calculating the feature amount by a convolution operation of the image.

3. The image processing apparatus according to claim 1, wherein calculating comprises calculating the feature amount representing a gradient magnitude by a differential operation of the image.

4. The image processing apparatus according to claim 3, wherein calculating comprises setting the feature amount of areas other than the expanded foreground area to a predetermined value.

5. The image processing apparatus according to claim 1, wherein expanding comprises expanding the foreground area with respect to each of the plurality of reduced images according to respective reduction rates.

6. A method for processing an image, the method comprising:
inputting an image;
determining a foreground area and a background area in the image;
reducing the input image at a plurality of reduction rates;
expanding the determined foreground area with respect to each of a plurality of reduced images obtained by reducing the input image at the plurality of reduction rates, by adding, to the foreground area, a surrounding area which is required for obtaining a feature amount of a boundary between the background area and the foreground area;
calculating a feature amount of the expanded foreground area; and
detecting an object from the foreground area using the feature amount of the expanded foreground area.

7. A non-transitory storage medium storing a program for causing a computer to execute each step in a method according to claim 6.

* * * * *